United States Patent [19]
Drozak

[11] 3,794,121
[45] Feb. 26, 1974

[54] SOIL AERATOR

[76] Inventor: David A. Drozak, 2693 E. College Ave., Decatur, Ga. 30030

[22] Filed: Aug. 4, 1972

[21] Appl. No.: 278,029

[52] U.S. Cl..................... 172/21, 172/122, 172/554
[51] Int. Cl............................................. A01b 45/02
[58] Field of Search ....... 172/21, 22, 554, 540, 122, 172/713; 111/91

[56] References Cited
UNITED STATES PATENTS

| | | | |
|---|---|---|---|
| 2,580,236 | 12/1951 | Mascaro | 172/21 X |
| 1,898,214 | 2/1933 | Richards | 172/554 X |
| 3,264,877 | 8/1966 | Boxrud | 172/22 X |
| 2,088,209 | 7/1937 | Nolte | 172/22 |
| 3,171,498 | 3/1965 | Logan | 172/554 X |

FOREIGN PATENTS OR APPLICATIONS

| | | | |
|---|---|---|---|
| 441,434 | 1/1936 | Great Britain | 172/22 |
| 71,103 | 7/1915 | Austria | 172/540 |

Primary Examiner—Stephen C. Pellegrino
Attorney, Agent, or Firm—Harold D. Jones, Jr.

[57] ABSTRACT

A soil aerator wherein a cylindrical drum is mounted on a framework to be carried by a tractor. A plurality of tubular soil penetrating spikes are connected to protrusions extending from the external surface of the cylindrical drum by inserting the openings of the tubular spikes over the protrusions and into abutment with the drum.

7 Claims, 3 Drawing Figures

PATENTED FEB 26 1974 3,794,121

SOIL AERATOR

BACKGROUND OF THE INVENTION

Soil aerators and similar equipment utilized to penetrate the surface of the ground and loosen the subsoil must be manufactured from relatively durable heavy materials so that the soil penetrating elements can penetrate the soil and will not be easily damaged when engaging hard objects in or on the surface of the ground. In the past, solid spikes and other soil penetrating elements have been rigidly connected to rotatable supporting elements, as by bolting or welding the spikes to the support element. The connection between the spikes and support element must maintain the spikes securely and rigidly attached to the rotatable element because of the large compressive and bending forces encountered by each of the individual spikes of the soil aerator. The large forces encountered by the soil penetating spikes tend to cause the spikes to wear rapidly and to frequently break, crack, etc., and the requirement to securely connect the soil penetrating spikes to the rotatable element makes it difficult to remove a damaged spike from and attach a new spike to the rotatable element. In addition, the configuration of many of the soil penetrating spikes of conventional aerators causes substantial damage to the surface of the soil which usually is planted with grass or other ground cover vegetation.

SUMMARY OF THE INVENTION

Briefly described, the present invention comprises a soil aerator which includes a rotatable drum mounted on a framework to be lifted from and lowered toward the soil by a tractor with a conventional hydraulic lift attachment. The rotatable drum has radiating from its external annular surface a plurality of tubular soil penetrating spikes. The ends of each spike adjacent the rotatable drum has its opening inserted over a spike support protrusion attached to the drum so that the circular ends of the soil penetrating spikes are juxtaposed the external surface of the rotable drum. The outer ends of the soil penetrating spikes are truncated at an angle so that the outer ends of the spikes are elliptically formed. The spikes are oriented so that their elliptical ends face generally in the direction of rotation of the rotatable drum, where the spikes can easily penetrate the surface of the soil, and as the spikes are withdrawn from the soil, minimum distrubance of the surface of the soil will occur.

Thus, it is an object of the present invention to provide a soil aerator that is durable, inexpensive to construct and maintain, and which functions to expediently aerate the earth with a minimum disturbance of the surface of the soil.

Other objects, features and advantages of the present invention will become apparent upon reading the following specification, when taken in conjunction with the accompanying drawing.

DESCRIPTION OF A PREFERRED EMBODIMENT

Figure 1:
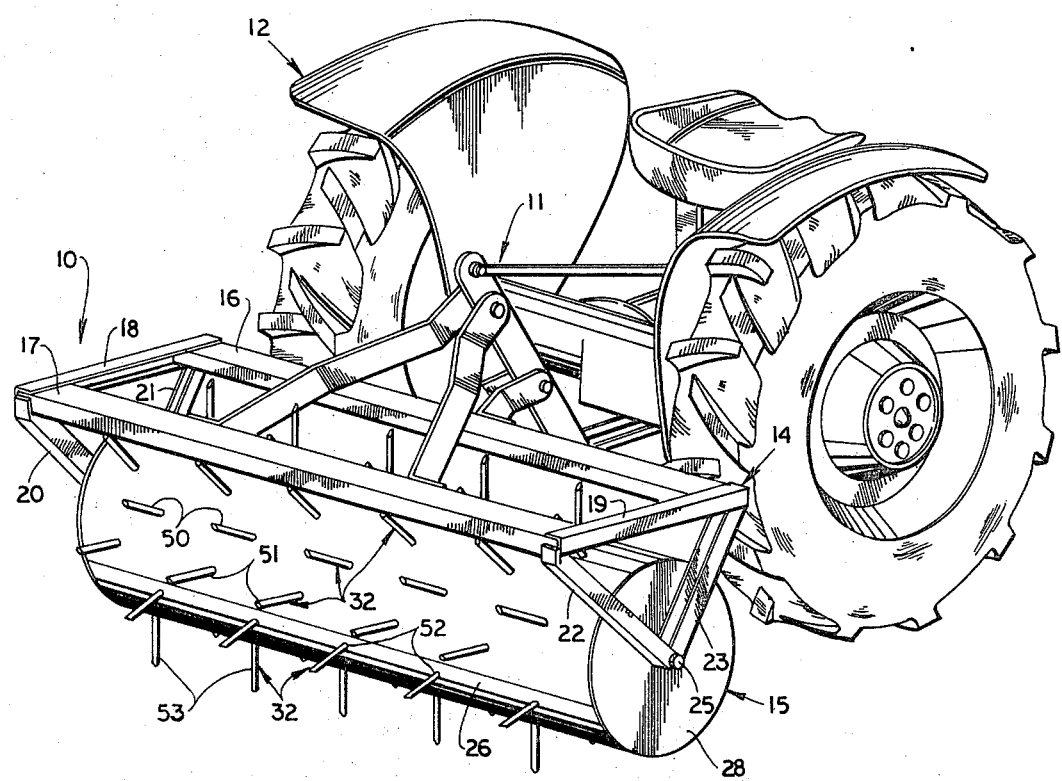
FIG. 1 is a partial perspective view of the soil aerator and its towing tractor.

Referring now in more detail to the drawing, in which like numerals indicate like parts throughout the several views, FIG. 1 shows soil aerator 10 attached to the hydraulic lift 11 of a tractor 12. Soil aerator 10 comprises a framework 14 which is attached to the hydraulic lift 11 and a rotatable support member or drum 15 mounted on the framework 14. Framework 14 comprises a rectangular upper frame which includes front and rear frame bars 16 and 17, end frame bars 18 and 19, and downwardly converging end frame members 20 and 21 at one end and 22 and 23 at the other end. The triangular arrangement of frame elements 18, 20 and 21 and 19, 22 and 23 form triangular end frames, and bearings such as bearings 25 are connected between the triangular end frames and drum 15.

Drum 15 comprises an annular shell 26 which is of constant diameter along its length and which is closed at its ends by end disks such as disk 28. Bearings 25 extend centrally into the end disks 28 to rotatably support drum 15. Drum 15 is therefore rotatable about its longitudinal centerline 29.

Figure 3:
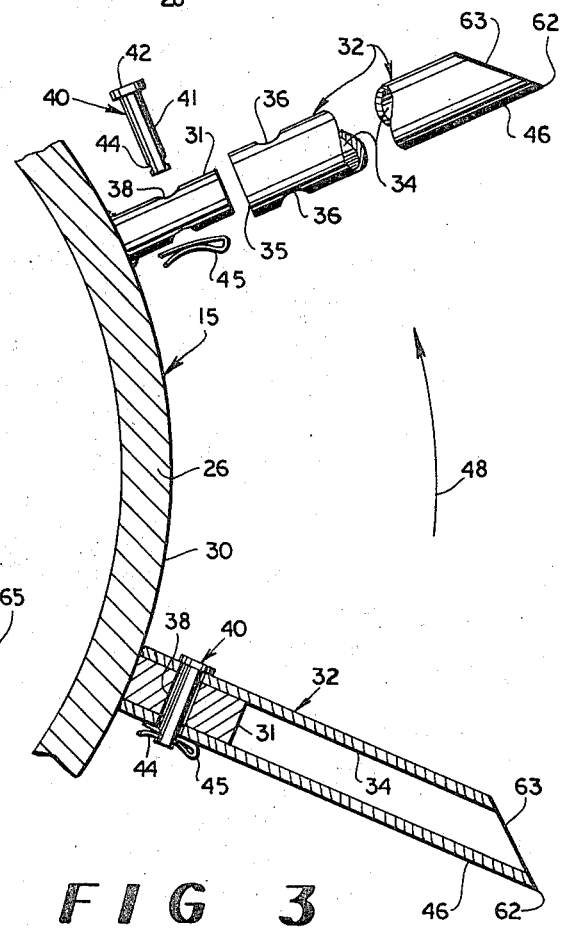
FIG. 3 is a detail illustration of the soil aerator, showing the manner in which the soil penetrating spikes are attached to the rotatable drum.

As is illustrated in FIG. 3, the external surface 30 of annular shell 26 of drum 15 includes a plurality of support protrusions 31 which are rigidly connected to the external surface 30 by welding or other conventional attachment methods. Each support protrusion is cylindrically shaped and its longitudinal centerline extends radially outwardly from the external surface 30 of annular shell 26 or radially outwardly from the axis of rotation or longitudinal centerline 29 of drum 15. A plurality of soil penetrating spikes 32 are provided and a spike 32 is attached to each support protrusion 31. Each soil penetrating spike 32 is rectilinear and of tubular configuration, defining central circular opening 34 which extends along its length from end to end. Opening 34 of each spike 32 is of a diameter only slightly larger than the external diameter of each support protrusion 31, and each spike 32 has its opening 34 at one of its ends 35 inserted about a support protrusion 31. Aligned openings 36 are formed adjacent the ends 35 of each spike 32, and bores 38 of corresponding diameter are formed in each support protrusion 31. The aligned openings 36 are spaced a distance from the end 35 of each spike 32 which corresponds to the spacing of the bores 38 of the support protrusion 31 from the convex external surface 30 of annular shell 26, so that when the soil penetrating spikes 32 are inserted over the support protrusions 31 with their ends 35 in abutment with the surface of shell 26, the aligned openings 36 will be alignable with the bores 38. The shanks 41 of pins 40 are inserted through the aligned openings and bores 36 and 38 until the end caps 42 of the pins engage the outer surfaces of the spikes 32. The end of the shank 41 opposite from end cap 42 has a cotter pin opening 44 extending transversely therethrough and a cotter pin or other securing element 45 is inserted through the opening 44 to hold the pin 40 in place.

The opposite or outer end 46 of each soil penetrating spike 32 is truncated at an angle which causes the outer distal end of the spike to be elliptically formed. Drum 15 is arranged to rotate in the direction indicated by arrow 48, and the face of the elliptically shaped end 46 of each soil penetrating spike is oriented so as to face in the direction of rotation.

As is illustrated in FIG. 1, the soil penetrating spikes 32 and their support protrusions 31 are arranged in a plurality of rows which extend parallel to or along the axis of rotation 29 of the drum 15. Alternate rows of the soil penetrating spikes are offset along the axis of rotation 29 from the next adjacent rows of spikes. For instance, the spikes 32 of row 50 are offset along the axis of rotation 29 from the spikes 32 of the next adjacent row 51. The odd numbered rows 51, 53, etc. of spikes are offset along the axis of rotation 29 from the even numbered rows 50, 52, etc. of spikes, and all of the rows are circumferentially spaced about the annular shell 26.

Figure 2:
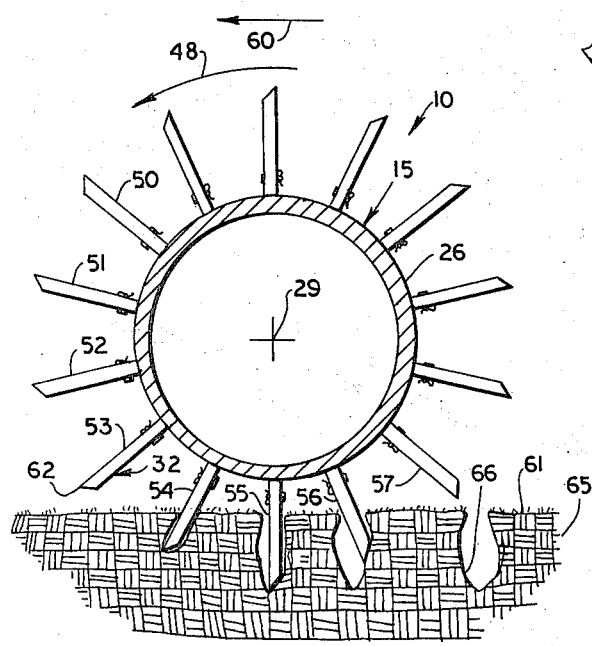
FIG. 2 is a side cross sectional view of the soil aerator without the framework, showing the manner in which the spikes penetrate the soil.

As is illustrated in FIG. 2, when the soil aerator 10 is moved in the direction indicated by arrow 60 so that it rotates in the direction indicated by arrow 48, the rows of spikes will sequentially penetrate the surface 61 of the soil. For instance, the row 53 of spikes rotates downwardly toward engagement with the surface of the soil until the pointed outer tips 62 of the spikes 32 engage the surface of the soil. The elliptical face 63 of the truncated distal end 46 of each spike 32 usually slices into the surface of the soil because of the angle it makes with the surface of the soil as the spike approaches the ground. The pointed end 62 assures that the spikes effectively penetrate the soil surface and directs the spikes into the soil. As illustrated by the row 54 of spikes 32, each row of spikes progressively penetrates the soil surface and moves into the subsoil 65 until the rows of spikes are vertically oriented, as illustrated by the row 55, whereupon the rows of spikes begin to be withdrawn from the soil as illustrated by rows 56 and 57. As the spikes rotate with the drum 15 and as the spikes move in the subsoil, as illustrated by rows 54, 55 and 56, the soil adjacent the spikes is loosened and shifted to a substantial extent by the working action of the spikes adjacent the soil. When the spikes are withdrawn from the soil, the angle of the truncated distal end of the spikes allow the spikes to be withdrawn with a minimum of disturbance to the soil surface 61. The impression left behind in the soil as the soil aerator moves across the ground is an opening 66 which is larger in the subsoil 65 than at the soil surface 61, and the movement of the soil by the spike in the ground substantially loosens the soil in the vicinity of the opening.

When each spike 32 first engages the surface of the soil, the forces encountered by each spike are primarily compressive forces along the length of the spikes. Since each spike 32 is juxtaposed the concave external surface 30 of the annular shell 26, the compressive forces will be transmitted from the soil through the spikes to the external surface of the shell. Pin 40 will encounter little, if any, of the compressive forces transmitted to the spikes. As the spikes penetrate and dig into the soil, bending forces will be encountered by the spikes 32. Since the external surfaces of the support protrusions 31 correspond to the size and shape of circular openings 34 of the spikes, and since the support protrusions 31 project into spikes, the bending forces will be transmitted from the spike to the support protrusions, and the pins 40 which hold the spikes 32 on the protrusions 31 normally will not encounter much, if any of the bending forces.

When a spike 32 is to be replaced, its cotter pin 45 is withdrawn from the opening 44 in the pin 40, the pin is removed from the aligned openings and bore 36 and 38 of the spike and support protrusion, and the spike is withdrawn from the support protrusion. The new spike is inserted back over the same support protrusion and the pin 40 is replaced through the aligned openings and bore.

The support protrusion 31 is protected from abrasion, etc. from external sources, so that its bore 38 and its external configuration are normally preserved. Thus, support protrusions 31 normally will always be of the proper size and shape to fit within the openings of the spikes.

The staggered relationship of the spikes in the rows of spikes provides for a large number of spikes to be present to penetrate the soil. Also, the offset or staggered relationship of the spikes of adjacent rows of spikes as opposed to placing the adjacent rows of spikes all in a single row allows more weight or downward force to be applied to the spikes of each row as they penetrate the soil. For instance, the row 54 of spikes shown in FIG. 2 which is penetrating the subsoil has more weight per spike in its row than it would have if the spikes of the rows 53 and 54 were combined in a single row. Thus, the circumferential displacement of the spikes about the annular shell 26 causes the spikes to expediently penetrate the soil.

The tubular or circular cross-sectional configuration of the spikes 32 provides the spikes with maximum strength characteristics per pound of metal.

The direct attachment of the framework 14 to the hydraulic lift assembly 11 of the tractor 12 allows the soil aerator 10 to be lifted away from the ground when the tractor is to be turned sharply, or when the tractor is to pass over a sidewalk or other impenetrable surface, etc. Moreover, when the soil aerator is moved into engagement with the ground, the depth of penetration of the spikes can be controlled by the hydraulic mechanism of the tractor. In addition, the external configuration of the annular shell 26 prevents the spikes from penetrating the soil beyond a predetermined depth.

While this invention has been described in detail with particular reference to preferred embodiments thereof, it will be understood that variations and modifications can be effected within the spirit and scope of the invention as described hereinbefore and as defined in the appended claims.

I claim:

1. A soil aerating apparatus comprising a framework, a cylindrical drum member mounted on said framework and rotatable with respect to said framework about the longitudinal axis of said cylindrical drum member, a plurality of protrusions extending from the exterior surface of said drum member, said protrusions each being rectilinear with annular outside surfaces and of constant diameter along their lengths, said protrusions being oriented with their longitudinal axes extending radially outwardly from the longitudinal axis of said cylindrical drum member, a plurality of rectilinear open end tubular spike members each defining a circular opening extending centrally along its length and mounted on a protrusion and each having its opening at one end inserted over a protrusion and its said one end juxtaposed the external surface of said cylindrical drum member for abutment with said cylindrical drum member, the opposite end of each of said spike members being truncated at an angle and elliptically shaped, the diameter of the opening at the said one end of each of said spike members being sized to fit snugly about said protrusions, aligned openings extending through said protrusions and the spikes mounted on the protrusions, and a pin member extending through said aligned openings of said protrusions and spikes mounted on said protrusions for holding the spikes on the protrusions and preventing the spikes from rotating on the protrusions.

2. A soil aerating apparatus comprising a rotatable support member rotatable in a predetermined direction, a plurality of rectilinear support protrusions of circular cross section connected to said rotatable support member and extending radially outwardly from the axis of rotation of said rotatable support member, a plurality of rectilinear spike members, each of said tubular spike members having a circular opening in one of its ends of a size to fit snugly about one of said protrusions, said one end of the spike members inserted over a support protrusion and juxtaposed said rotatable support member, means for securing said one end of each of said tubular spike members on said support protrusions for abutment with said rotatable support member, each of said support protrusions and said tubular spike members inserted on a support protrusion extending radially outwardly from the axis of rotation of said rotatable support member and having its outer end truncated at an angle which forms a surface facing the direction of rotation of said rotatable support member.

3. The soil aerating apparatus of claim 2 and wherein said rotatable support member comprises a cylindrical drum rotatable about its longitudinal centerline.

4. The soil aerating apparatus of claim 2 and wherein each of said tubular spike members defines a circular inner opening extending longitudinally therethrough, and the truncated outer end thereof is elliptically formed.

5. The soil aerating apparatus of claim 2 and wherein said means for securing each of said spike members on said support protrusions comprises aligned openings defined in said each spike member and its support protrusion, and a connecting pin inserted through the aligned openings of each spike member and its support protrusion.

6. The soil aerating apparatus of claim 2 and wherein said plurality of support protrusions are arranged in a plurality of aligned rows about said rotatable support member, each row of said support protrusions being parallel to the axis of rotation of said rotatable support member, with the support protrusions of alternate rows of support protrusions being offset along the axis of rotation of said rotatable support member from the support protrusions in the next adjacent row of support protrusions.

7. The soil aerating apparatus of claim 2 and further including a framework connected to and rotatably supporting said rotatable support member for mounting said rotatable support member on the hydraulic lift assembly of a tractor.

* * * * *